United States Patent Office 3,279,207
Patented Oct. 18, 1966

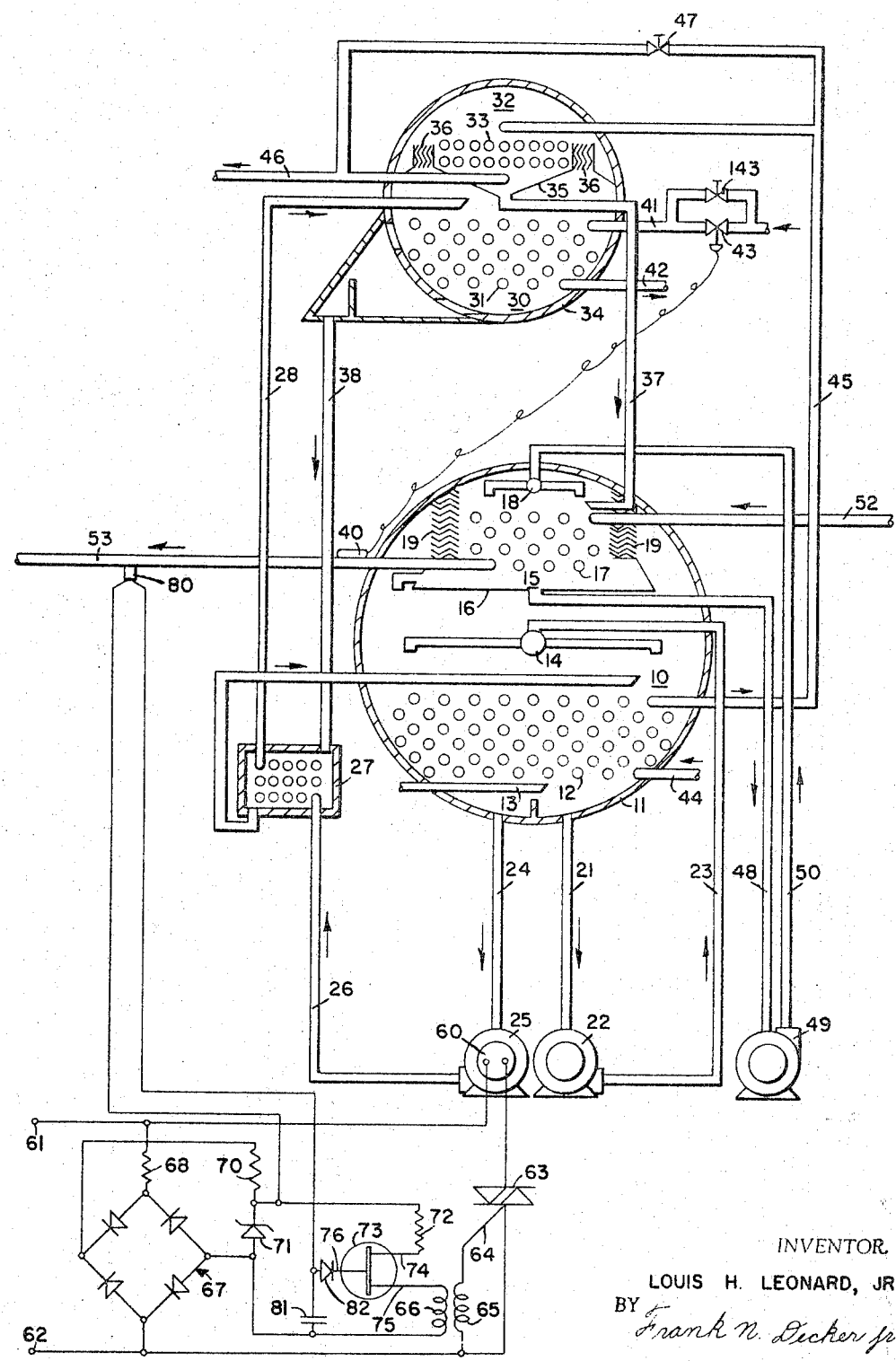

3,279,207
ABSORPTION REFRIGERATION SYSTEMS
Louis H. Leonard, Jr., De Witt, N.Y., assignor to Carrier Corporation, Syracuse, N.Y., a corporation of Delaware
Filed Dec. 8, 1964, Ser. No. 416,766
8 Claims. (Cl. 62—141)

This application relates to absorption refrigeration systems and, more particularly, to an improved control system for varying the capacity of an absorption refrigerating machine.

In most absorption refrigeration systems, it is desirable to provide a means of adjusting the refrigeration capacity of the system to accommodate a wide range of different or varying refrigeration loads which may be imposed on the system. The simplest method of control consists in turning the machine on or off depending on whether there is a demand for refrigeration. Generally, however, this type of control is unsatisfactory for air conditioning and refrigeration applications where it is often desirable that the machine produce chilled water at a specific temperature at all times. Consequently, various means of modulating the capacity of an absorption refrigeration system to provide a uniform chilled water temperature is generally required. In a typical absorption refrigeration machine of the type employing a hygroscopic aqueous salt solution, such as lithium bromide as the absorbent and water as the refrigerant, a danger exists that excessive heat input to the generator may cause overconcentration of the salt solution and blockage of solution passages. It is therefore, also, desirable for the control system to reduce the heat input to the generator to prevent overconcentration of the absorbent solution, especially when the absorption machine is operated at reduced capacities, where the tendency to overconcentrate becomes more acute.

In the past, control of an absorption refrigeration machine has been satisfactorily achieved by employing various arrangements such as shown in Berestneff et al., Patent No. 2,565,838, granted Aug. 28, 1951, or Leonard Patent No. 3,054,272, granted Sept. 18, 1962, to which reference is made for a detailed description of the control features and operation of typical absorption refrigeration machines. The control systems illustrated by the foregoing patents, require various control valves for regulation of the capacity of the absorption machine. While satisfactory valves can be obtained for use with absorption machines, such valves are generally expensive and require sealing against the entrance of ambient atmosphere into the absorption machine.

Accordingly, it is a principal object of this invention to provide an improved absorption refrigeration system including an improved control arrangement.

In the illustrated preferred embodiment of this invention, these objects are achieved by providing an absorption refrigeration machine with a variable speed pump in the weak absorbent solution line which forwards weak solution from the absorber to the generator. An electronic circuit is provided to regulate the speed of the alternating current pump motor and, hence, the quantity of weak solution supplied to the generator, in accordance with the refrigeration demand on the absorption machine. Preferably, the control circuit comprises a phase control which adjusts the average power supplied to the pump motor on each half cycle of alternating current in accordance with the leaving chilled water temperature from the absorption machine. In addition, suitable means are provided to prevent overconcentration of absorbent solution in the generator. The overconcentration control may desirably comprise a simple shut-off valve in parallel with a restricted bypass passage for varying the supply of heat to the generator in accordance with leaving chilled water temperature.

These and other objects of this invention will be more readily understood by reference to the following detailed description and drawing wherein the figure is a schematic view, partly in cross-section, showing one embodiment of an absorption refrigeration machine employing an improved control system in accordance with this invention.

Referring particularly to the drawing, there is shown a typical absorption refrigeration machine comprising an absorber section 10 within a shell 11. A plurality of heat exchange tubes 12 are provided within the absorber section. A purge line 13 leads from the absorber and conducts noncondensible gases therefrom to a suitable purge unit (not shown). A spray header 14 is located above the absorber section.

Also disposed in shell 11 is an evaporator section 15 comprising a pan-like member 16 within which is disposed a plurality of heat exchange tubes 17. A spray header 18 is located above heat exchange tubes 17 for distributing refrigerant thereover. Evaporator section 15 is in open communication with absorber section 10 through eliminators 19 which prevent entrained liquid refrigerant particles from being carried from evaporator 15 into absorber 10.

In operation, a suitable refrigerant is sprayed over tubes 17 in evaporator section 15 and a suitable absorbent solution is sprayed over tubes 12 in absorber section 10. Consequently, refrigerant is vaporized in evaporator section 15 and passes through eliminators 19 into absorber section 10 where the refrigerant vapor is absorbed by the absorbent solution. The vaporization of the refrigerant in evaporator section 15 absorbs heat from the fluid passing through heat exchange tubes 17 and this heat is carried with the vapor into absorber section 10 where it is given up to a cooling fluid passing through heat exchange tubes 12. Thus, the evaporation of refrigerant in evaporator section 15 produces a cooling or refrigeration effect on the fluid to be chilled passing through heat exchange tubes 17.

Line 21 is connected to pump 22 and serves to circulate absorbent solution of intermediate strength accumulated in the lower portion of absorber section 10 through line 23 and spray header 14 over tubes 12. A line 24 leads from a lower portion of absorber section 10 containing weak solution and pump 25 serves to pass the weak solution through line 26 and solution heat exchanger 27 through line 28 to generator section 30.

As used herein, the term "strong solution" refers to an absorbent solution strong in absorbing power and the term "weak solution" refers to absorbent solution weak in absorbing power. The term "intermediate strength solution" refers to a solution having a concentration intermediate that of strong solution and weak solution. A suitable absorbent for a refrigeration system of the type described comprises a hygroscopic aqueous salt solution such as lithium bromide and water. A suitable refrigerant is water.

The absorption of refrigerant vapor by absorbent solution in absorber section 10 dilutes the absorbent solution and diminishes the refrigerant supply. In order to maintain the refrigeration mechaine in operation, it is necessary to concentrate this weak solution by separating it from the absorbed refrigerant. For this purpose, a generator section 30 and a condenser section 32 are provided.

Generator section 30 is located in shell 34 and comprises a plurality of heat exchange tubes 31 for passing steam or other heating fluid. Also located within shell 34 is condenser section 32 comprising a pan-like member 35 within which is disposed a plurality of heat exchange tubes 33 for passing cooling water. Eliminators 36 are provided to prevent strong solution from being entrained in refrigerant vapor passed from generator section 30 to condenser section 32.

A line 37 leads from pan-like member 35 to evaporator section 15 and serves to return condensed refrigerant from the condenser section to the evaporator section. Line 38 extends from generator section 30 through solution heat exchanger 27 to absorber section 10 and serves to return relatively hot, strong absorbent solution from the generator section to the absorber section while passing it in heat exchange relation with relatively cool, weak solution being forwarded to the generator for concentration therein.

Inlet line 41 and outlet line 42 are provided to conduct a heating medium such as steam or hot water through heat exchange tubes 31, in order to concentrate the weak solution by boiling off refrigerant vapor therefrom. A control valve 43 is provided in line 41 to control the supply of heating medium to the generator.

The refrigerant vaporized in generator 30 passes through eliminators 36 and is condensed in condenser 32. A cooling water inlet line 44 is connected to heat exchange tubes 12 in absorber section 10 from which the cooling water passes through line 45 and heat exchange tubes 33 in the condenser section. The cooling water is then discharged through line 46. An appropriate bypass line and valve 47 may be provided to bypass cooling water around the condenser section to provide a minimum condensing temperature. The cooling water serves to remove the heat of dilution and condensation from the absorbent solution in absorber section 10 and serves to remove the heat of vaporization to condense refrigerant vapor in condenser section 32.

A suitable recirculation line 48 and recirculation pump 49 pass refrigerant from pan 16 of the evaporator section through line 50 to spray header 18 so that refrigerant may be sprayed over heat exchange tubes 17 to wet them and aid in evaporation of the refrigerant and cooling of heat exchange tubes 17. Entering line 52 and leaving line 53 are provided to conduct a heat exchange fluid to be cooled, such as water, through heat exchange tubes 17 to cool the fluid by the resulting heat exchange with the evaporating refrigerant in evaporator 15. This cooled heat exchange fluid is then passed through line 53 to suitable remotely located heat exchangers (not shown) to provide cooling in the desired areas.

In accordance with this invention, weak solution pump 25 is preferably driven by an alternating current motor 60 which is connected to a source of alternating current such as power line terminals 61, 62 through a switch 63. Switch 63 may desirably be a bidirectional gated solid state switch of a type sold under the trademark "Triac." Switch 63 is provided with a gate 64 in series with the secondary winding 65 of a pulse transformer by which the switch is triggered to a conducting state by either a positive or negative pulse being applied to gate 64. Switch 63 should be sufficiently fast in operating so that it may be switched on during any desired portion of each half cycle of alternating current supplied to motor 60, to provide a desired average power so that the motor speed and consequent pump speed is varied in accordance with the capacity demand on the absorption machine.

A control circuit is provided to control the operation of switch 63 in accordance with the desired capacity of the absorption machine. As shown in the drawings, a full wave diode rectifier circuit 67 is connected in series with a dropping resistor 68 to provide a source of D.C. voltage across a series connected resistor 70 and Zener diode 71. It will be appreciated that Zener diode 71 has a variable resistance characteristic such that it provides a constant voltage drop across its terminals. A series circuit comprising unijunction transistor 73 having one base 74 connected in series with resistor 72 and another base 75 connected in series with the primary winding 66 of the pulse transformer is connected across Zener diode 71 to provide a constant voltage to the series circuit.

A temperature sensitive resistance element, such as thermistor 80, is connected in series with a charging capacitor 81 across the constant voltage provided by Zener diode 71. Thermistor 80 is preferably secured to leaving chilled water line 53 to sense the refrigeration load on the absorption machine by sensing the chilled water temperature. Unijunction transistor 73 has an emitter 76 which is connected through a diode 82 which prevents leakage current from charging capacitor 81, to a junction between thermistor 80 and charging capacitor 81. It may be desirable in practice to add various additional circuits to prevent spurious gating of switch 63. Also, it is desirable to employ a high resistance motor rotor in motor 60 having a resistance tailored to the control circuit for best operation.

It will be appreciated that the circuit shown is illustrative generally of a phase control type of motor speed control. The circuit shown is merely illustrative of one type of motor speed control system and other types of motor speed control can be adapted to this invention.

In operation, switch 63 is in a nonconducting state and motor 60 is deenergized until a pulse is applied to gate 64. A charge builds up on charging capacitor 81 at a rate which is determined by the resistance of thermistor 80, which in turn is a function of the chilled water temperature in line 52. When the charge on capacitor 81 reaches a predetermined value, unijunction transistor 73 becomes conducting and the charge on capacitor 81 is discharged through primary winding 66 of the pulse transformer. When capacitor 81 discharges, a pulse is induced in secondary winding 65 of the pulse transformer which is applied to gate 64 of switch 63 causing the switch to conduct.

Switch 63 is preferably a solid state device having the characteristic that once it is turned on by a pulse being applied to gate 64, it remains in the conducting state until the voltage across the device becomes negligible. Consequently, switch 63 remains conducting after a pulse is applied to gate 64 until the end of the half cycle of alternating current during which it begins conducting. The value of the electrical components are chosen so that switch 64 is turned on for a time during each half cycle by the control circuit such that the power supplied to motor 60 is just sufficient to rotate pump 25 at a speed which provides the desired solution flow and, consequently, the desired refrigeration capacity. The resistance range of thermistor 80, is chosen so that as the leaving chilled water temperature in line 53 increases, indicating an increased refrigeration load, the resistance of the thermistor decreases and capacitor 81 charges more rapidly. Consequently, switch 63 is turned on for a greater period of time during each half cycle of alternating current, thus increasing the speed of motor 60 and pump 25 to provide greater weak solution flow from absorber 10 to generator 30. The additional solution flow to generator 30 provides increased return of strong solution through line 38 and, consequently, increases the refrigeration capacity of the machine to compensate for the increased load, to reduce the chilled water temperature to the desired temperature.

It is desirable to prevent overconcentration of strong solution in generator 30 to prevent crystallization of strong solution when cooled in heat exchanger 27. Overconcentration might occur during periods of relatively light load when pump 25 operates at a relatively low speed and passes only a relatively small quantity of weak solution to generator 30. In order to prevent overconcentration of the solution, a suitable valve 43 is provided in line 41 which supplies heating medium to the generator. The heating medium may be steam, hot water, hot gas, or any other hot fluid. Valve 43, may be a shut-off valve. As long as there is strong absorbent solution in the generator, the capacity of the machine can be controlled by varying the speed of pump 25, even when heat is not being supplied to the generator. Valve 43 is connected to a suitable thermostatic bulb 40 on leaving chilled water line 53 and a manual valve 143 may be employed to bypass a relatively small fixed quantity of heating medium around valve 143 to keep solution in generator 30 warm. Bulb 40 causes valve 43 to close and reduce the supply of heating medium to generator in the event that the leaving chilled water temperature drops excessively below the desired temperature, indicating a relatively light load on the generator. Conversely, valve 43 opens when the chilled water temperature rises excessively. If desired, valve 43 may be of the modulating type and valve 143 may be eliminated.

It will be appreciated that if the strong absorbent solution in the generator is sufficiently concentrated, or if the generator is sufficiently warm to continue concentrating solution, it is not necessary for valve 43 to open, and the rise in chilled water temperature may be compensated for by the control system increasing solution flow.

Alternatively, valve 43 may be responsive to any suitable condition of operation of the system, such as strong solution temperature in line 38 or a difference between generator and condenser temperatures, or the level of solution in absorber 10, as a means of preventing overconcentration of the strong solution. However, if valve 43 is a simple shut-off valve, it is preferred to provide a restricted bypass 143 so that some heat is continuously supplied to the generator in order to smooth out the operation of the system by preheating the solution and maintain it close to the boiling point. A system employing a bypass has the advantage that shut-off valves are inexpensive compared to modulating types.

A control system in accordance with this invention has the advantage that capacity control of the refrigeration machine is achieved while completely eliminating the need for an expensive solution valve. Since a solution pump of some type is generally used, it is only necessary to provide a suitable speed control for the solution pump motor. Solution pumps may be easily made relatively hermetic and foolproof in operation. Furthermore, variation of pump motor speed by electrical means completely eliminates the necessity of providing solution valve seals or mechanical parts which might fail in operation and lessens the likelihood of air leaking into the absorption machine.

Various modifications of the invention will be readily apparent to those skilled in the art. For example, other types of pump speed controls such as magnetic couplings or variable speed turbines may be used. Likewise, the solution pump may be otherwise located in the absorption machine passages so as to effectively provide control over the capacity of the machine. It will therefore be appreciated that there is shown and described merely a preferred embodiment of the invention and that it may be otherwise embodied in the scope of the following claims.

I claim:

1. An absorption refrigeration machine adapted to contain an absorbent solution and including a generator, an absorber, a condenser, and an evaporator connected by solution passages to provide refrigeration; a liquid pump in one of said solution passages to forward absorbent solution through said one passage; and means responsive to a condition of operation of said absorption refrigeration machine reflecting a need for adjusting the refrigeration capacity of said machine to control the speed of said pump to provide an increase in the flow of absorbent solution through said one passage upon an increased refrigerant demand being reflected on said system and to provide a corresponding change in the refrigeration capacity produced by said absorption refrigeration machine.

2. An absorption refrigeration machine adapted to contain an absorbent solution therein, said machine comprising an absorber, a generator, a condenser, and an evaporator; solution passage means to pass weak absorbent solution from the absorber to said generator for concentration of said weak absorbent solution in said generator; solution passage means to pass strong absorbent solution from said generator to said absorbed for absorption of refrigerant vapor in said absorber; at least one of said solution passages including pump means for circulating absorbent solution between said absorber and said generator, and means to control the speed of said pump means in response to the refrigerant demand imposed on the absorption refrigeration machine, said means comprising means to control the speed of operation of said pump to thereby control the rate of circulation of absorbent solution through said machine.

3. An absorption refrigeration machine adapted to contain an absorbent solution and including a generator, an absorber, a condenser, and an evaporator connected by solution passages to provide refrigeration; a liquid pump in one of said solution passages for forwarding absorbent solution through said passage; an alternating current driven electric motor for driving said pump; a phase control circuit having a current output connected to said alternating current electric motor for controlling the speed thereof, said phase control circuit including sensing means responsive to the refrigeration load imposed on said absorption refrigeration machine for controlling the capacity thereof by varying the effective power supplied to said motor and thereby varying the speed of said pump and the quantity of solution forwarded by said pump through said one passage, thereby adjusting the refrigeration capacity produced by said machine in accordance with the refrigeration load sensed by said sensing means.

4. An absorption refrigeration machine adapted to contain an absorbent solution therein, said machine comprising an absorber, a generator, a condenser, and an evaporator; solution passage means to pass weak absorbent solution from the absorber to said generator for concentration of said weak absorbent solution in said generator; solution passage means to pass strong absorbent solution from said generator to said absorber for absorption of refrigerant vapor in said absorber; at least one of said solution passages including pump means driven by an alternating current motor to forward solution through said one passage; switch means having means to actuate said switch means to a conducting state; said switch means being associated with said motor to control the passage of alternating current through said motor; means responsive to a condition of operation of said absorption refrigeration machine to control the duration of passage of current through said switch means during each half cycle of alternating current, to control the effective power supplied to said motor to an amount resulting in forwarding a quantity of solution through said one passage by said pump that provides the desired refrigeration capacity from said absorption refrigeration machine; means to supply heat to said generator to concentrate weak absorbent solution therein; and means to limit the supply of heat to said generator to prevent excessive concentration of absorbent solution therein.

5. An absorption refrigeration machine adapted to contain an absorbent solution and having a generator, a condenser, an evaporator, and an absorber connected by solution passages to provide refrigeration; a pump in one of said solution passages for forwarding absorbent solution therein; means to supply heat to said generator; means to vary the quantity of heat supplied to said generator in response to a condition of operation of said absorption refrigeration machine to prevent excessive concentration of absorbent solution in said generator; and means to control the speed of operation of said pump in response to a condition of operation of said absorption refrigeration machine to increase the quantity of absorbent solution forwarded through said one solution passage upon an increase in refrigeration demand imposed on said machine, so as to provide a desired refrigeration capacity from said absorption refrigeration machine.

6. An absorption refrigeration machine adapted to contain an absorbent solution therein and having an absorber, an evaporator by cooling a fluid medium, a generator, and a condenser; weak solution passage means to supply weak absorbent solution from said absorber to said generator for concentration therein, said weak solution passage means including a solution pump; an alternating current electric motor connected to drive said pump; means to control the speed of said pump in response to a function of the temperature of fluid medium cooled by said evaporator so as to increase the flow of weak absorbent solution to said generator when the temperature of said fluid medium rises; means to supply heat to said generator to concentrate weak absorbent solution therein; and means to limit the supply of heat to said generator to an amount below which any substantial crystallization of absorbent salt occurs.

7. An absorption refrigeration machine adapted to contain an absorbent solution therein and having an absorber, an evaporator for cooling a fluid medium, a generator, and a condenser; weak solution passage means to supply weak absorbent solution from said absorber to said generator for concentration therein, said weak solution passage means including a solution pump; an alternating current electric motor connected to drive said pump; means to control the speed of said pump in response to a function of the temperature of fluid medium cooled by said evaporator so as to increase the flow of weak absorbent solution to said generator when the temperature of said fluid medium cooled in said evaporator rises; means to supply heat to said generator to concentrate weak absorbent solution therein; and means to vary the amount of heat supplied to said generator section in response to a function of the temperature of fluid medium cooled by said evaporator to reduce the heat supplied to said generator when the temperature of said fluid medium chilled in said evaporator drops.

8. An absorption refrigeration machine adapted to contain an absorbent solution and having a generator, a condenser, an absorber and an evaporator connected to provide refrigeration, said absorption machine including weak solution passage means for forwarding weak absorbent solution from said absorber to said generator for concentration therein; strong solution passage means for forwarding strong absorbent solution from said generator to said absorber for absorption of refrigerant vapor therein; a solution pump in one of said solution passage means to forward solution therein; capacity control means for varying the average power supplied to said pump in accordance with the refrigeration load imposed on said machine to control the refrigeration capacity of said machine; and concentration control means to prevent overconcentration of said absorbent solution in said generator responsive to a condition of operation of said machine.

References Cited by the Examiner
UNITED STATES PATENTS

| | | | |
|---|---|---|---|
| 1,975,086 | 10/1934 | Dickey | 122—451 |
| 2,372,087 | 3/1945 | Karassik | 122—451 |
| 3,195,318 | 8/1965 | Miner | 62—148 |

LLOYD L. KING, *Primary Examiner.*

UNITED STATES PATENT OFFICE
CERTIFICATE OF CORRECTION

Patent No. 3,279,207                                                 October 18, 1966

Louis H. Leonard, Jr.

It is hereby certified that error appears in the above numbered patent requiring correction and that the said Letters Patent should read as corrected below.

Column 5, lines 67 and 68, for "refrigerant" read -- refrigeration --; column 6, line 4, for "absorbed" read -- absorber --; line 9, for "refrigerant" read -- refrigeration --.

Signed and sealed this 5th day of September 1967.

(SEAL)
Attest:

ERNEST W. SWIDER                                     EDWARD J. BRENNER
Attesting Officer                                          Commissioner of Patents